(12) United States Patent
Tait et al.

(10) Patent No.: US 12,241,373 B1
(45) Date of Patent: Mar. 4, 2025

(54) SEAL FOR A WAVE ROTOR DISK ENGINE

(71) Applicant: Government of the United States, as represented by the Secretary of the Air Force, Wright-Patterson AFB, OH (US)

(72) Inventors: Christopher Tait, San Mateo, CA (US); Pejman Akbari, Pasadena, CA (US); Brian Sell, Oakwood, OH (US); Marc Polanka, Wright-Patterson AFB, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 75 days.

(21) Appl. No.: 17/859,043

(22) Filed: Jul. 7, 2022

Related U.S. Application Data

(62) Division of application No. 16/736,223, filed on Jan. 7, 2020, now Pat. No. 11,459,902.

(51) Int. Cl.

| F01D 11/00 | (2006.01) |
|---|---|
| F01D 11/08 | (2006.01) |
| F01D 11/16 | (2006.01) |
| F01D 25/24 | (2006.01) |
| F02C 7/28 | (2006.01) |

(52) U.S. Cl.
CPC .......... *F01D 11/001* (2013.01); *F01D 11/005* (2013.01); *F01D 11/08* (2013.01); *F01D 11/16* (2013.01); *F01D 25/246* (2013.01); *F02C 7/28* (2013.01); *F05D 2230/60* (2013.01); *F05D 2240/11* (2013.01); *F05D 2240/55* (2013.01)

(58) Field of Classification Search
CPC ... F01D 1/06; F01D 1/28; F01D 11/08; F01D 11/12; F01D 11/14; F01D 11/16; F01D 11/22; F05D 2240/11; F05D 2240/44; F05D 2240/311
See application file for complete search history.

(56) References Cited

U.S. PATENT DOCUMENTS

| 4,369,020 | A | | 1/1983 | Rahnke | |
|---|---|---|---|---|---|
| 5,104,287 | A | * | 4/1992 | Ciokajlo | F04D 29/526 |
| | | | | | 415/173.2 |
| 5,866,824 | A | | 2/1999 | Schieber | |
| 5,916,125 | A | | 6/1999 | Snyder | |
| 6,449,939 | B1 | | 9/2002 | Snyder | |
| 7,062,900 | B1 | * | 6/2006 | Brun | F01D 1/06 |
| | | | | | 60/39.35 |
| 7,435,049 | B2 | * | 10/2008 | Ghasripoor | F01D 11/14 |
| | | | | | 415/173.3 |
| 7,934,368 | B2 | * | 5/2011 | Muller | F01D 1/12 |
| | | | | | 60/39.45 |
| 9,856,791 | B2 | * | 1/2018 | Muller | F02C 3/165 |
| 9,976,436 | B2 | * | 5/2018 | Powell | F01D 11/22 |
| 10,385,775 | B2 | * | 8/2019 | Williams | F02C 7/06 |
| 2002/0192074 | A1 | * | 12/2002 | Turnquist | F16J 15/3288 |
| | | | | | 415/173.3 |

* cited by examiner

*Primary Examiner* — Brian P Wolcott
(74) *Attorney, Agent, or Firm* — AFMCLO/JAZ; Matthew D. Fair

(57) ABSTRACT

A unique seal for a wave rotor disk engine is disclosed herein. The seal is operable for sealing a region between a rotor and a rotor casing. The seal is spring loaded and will engage with the tip of the rotor to reduce pressure loss within the wave rotor disk engine.

5 Claims, 5 Drawing Sheets

SEAL FOR A WAVE ROTOR DISK ENGINE

Pursuant to 37 C.F.R. § 1.78(a)(4), this application is a Divisional Application of application Ser. No. 16/736,223 filed Jan. 7, 2020, currently pending and which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a wave rotor disk engine, and more particularly, but not exclusively to a seal for a wave rotor disk engine.

BACKGROUND

Wave rotor disk engines include a radial rotor and a turbine positioned radially outward of the rotor with each rotatable about a common axis of rotation. An air/fuel mixture enters the wave disk engine proximate the center of rotation and is ignited via a spark plug or other ignition source and is combusted between the radial blades of the rotor. The combustion front moves radially outward toward the turbine. A circumferential rotor case is positioned between the rotor and the turbine. At least one opening in the rotor case permits the combustion working fluid to pass from the rotor into the turbine wherein energy is extracted from the high pressure and high temperature working fluid and converted into mechanical and/or electrical energy as is conventional. In prior art engines, pressure losses and thus efficiency losses occur when the flow of combustion working fluid leaks past a tip clearance region between the rotor tips and the rotor casing. Sealing the tip clearance region would advantageously improve the efficiency of the wave disk engine. Accordingly, there remains a need for further contributions in this area of technology.

SUMMARY

One embodiment of the present disclosure includes a seal for a wave rotor disk engine. Other embodiments include apparatuses, systems, devices, hardware, methods, and combinations for a seal that engages the tips of a rotor to reduce pressure loss between the rotor and turbine of the wave disk engine. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
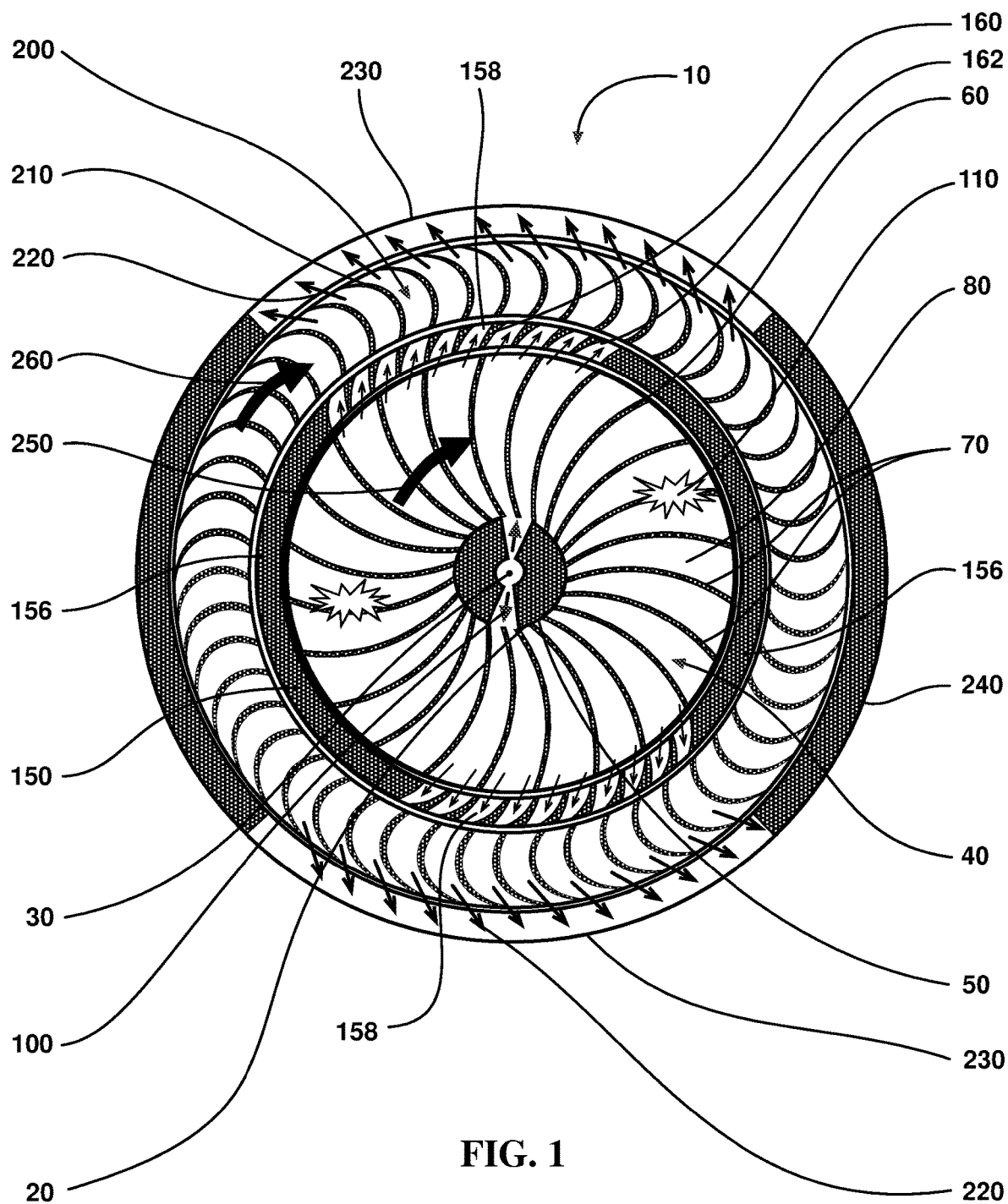
FIG. 1 is a cross sectional view of a wave disk engine according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended by the illustrations and descriptions of the illustrative embodiment(s). Any alterations and further modifications in the described embodiments, and any further applications of the principles of the invention as described herein are contemplated as would normally occur to one skilled in the art to which the invention relates.

Figure 2:
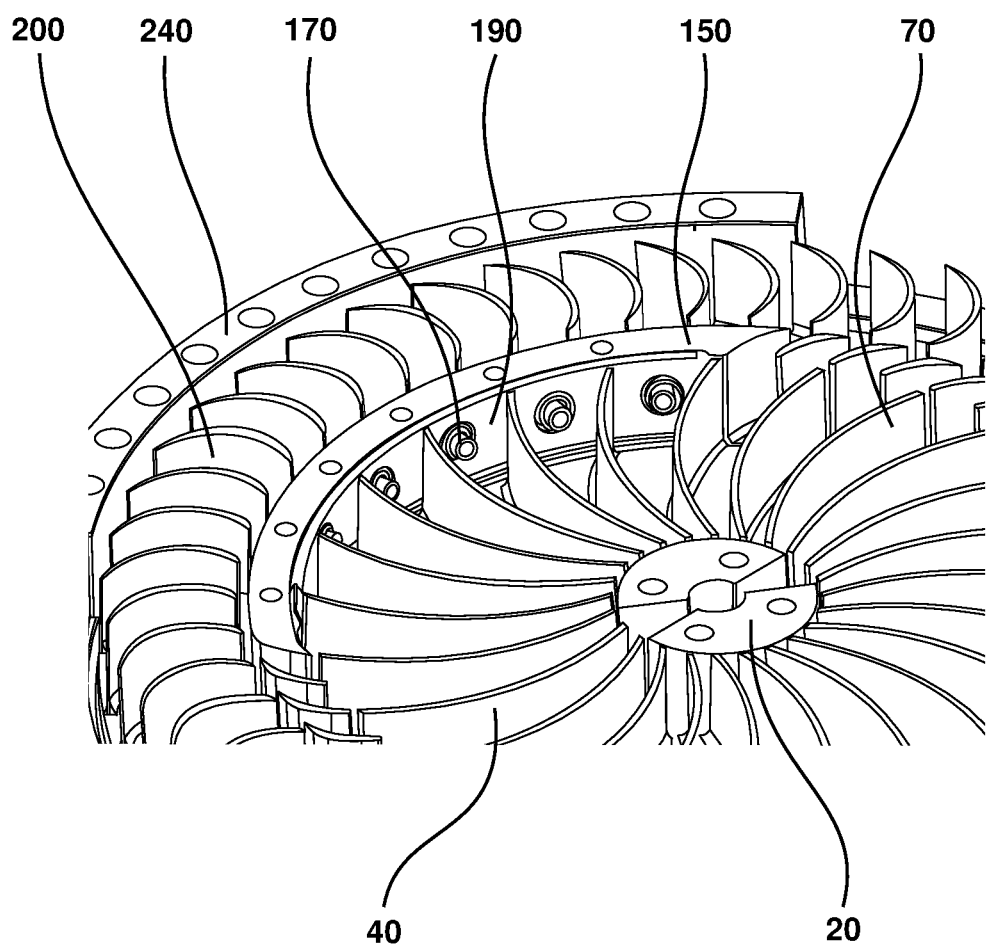
FIG. 2 is a perspective view of a portion of the wave disk engine of FIG. 1 having a seal assembled therewith.

Referring now to FIGS. 1 and 2, a schematic cross sectional view of a radial flow wave disk engine 10 is illustrated. FIG. 2 shows a portion of the radial flow wave disk engine 10 in a perspective view. The present disclosure as depicted in the radial flow wave rotor disk engine 10 is exemplary in nature and should not be construed as limiting in any patentable way. Thus, it should be understood that the apparatus, method and system for sealing as disclosed herein can be used in other types of turbomachinery apparatus such as axial flow machines or the like. By way of example and not limitation other types of machines may advantageously employ the systems disclosed herein including axial and radial flow gas turbine engines, pulse and rotating detonation engines, and non-engine turbomachinery type apparatus such as turbo-pumps and the like.

The wave rotor disk engine 10 includes a central inlet port 30 formed within a shaft 20 having a central axis for a rotating rotor 40 in the engine 10. The rotor 40 rotates with the shaft 20 and functions as both a compressor and a combustion chamber thus providing a significant reduction in size over that of an engine of similar power with separate rotor and combustor devices. The rotor 40 extends radially outward from a rotor hub 50 to a rotor tip 60. A plurality of rotor vanes 70 are spaced apart from one another to form a combustion channel 80 between each adjacent pair of vanes 70. A mixture of fuel and air is injected through one or more fuel/air inlets 110 formed in the shaft 20 proximate the hub of the rotor 40. The fuel/air mixture is injected into the rotor 40 as the rotor 40 is rotating about the shaft 20. The fuel/air mixture is then compressed and combusted to form combustion exhaust gas 100 within discrete combustion channels 80 as the flow is directed radially outward to toward the rotor tips 60.

A rotor case 150 is positioned circumferentially about the rotor 40. The rotor case 150 includes one or more seal regions 156 and one or more rotor flow exit regions 158. Each seal region 156 provides a unique sealing arrangement with the rotor tips 60 of the rotor vanes 70. The seal region(s) 156 will be described in more detail below. Each rotor flow exit region 158 includes a plurality of nozzles 160 defined by adjacent pairs of nozzle vanes 162 operable to accelerate the high temperature combusted gases into a turbine 200 positioned circumferentially around the rotor case 150. The turbine 200 includes a plurality of turbine blades 210 operable to convert the energy from the combustion working fluid into useful mechanical and/or electrical energy as is understood by those skilled in the art. The working fluid exits from the turbine 200 through a turbine outlet 220 that is in fluid communication with an outer case 240. The outer case 240 encompasses the turbine 200 and has exhaust ports 230 formed therewith to facilitate exhaust flow out of the wave disk engine 10. In one form of operation the rotor 40 and the turbine 200 of wave disk engine 10 rotate in the same direction as represented by arrows 250, 260 respectively. In other forms the rotation of the rotor 40 and turbine 200 may be in opposite directions.

Figure 3:
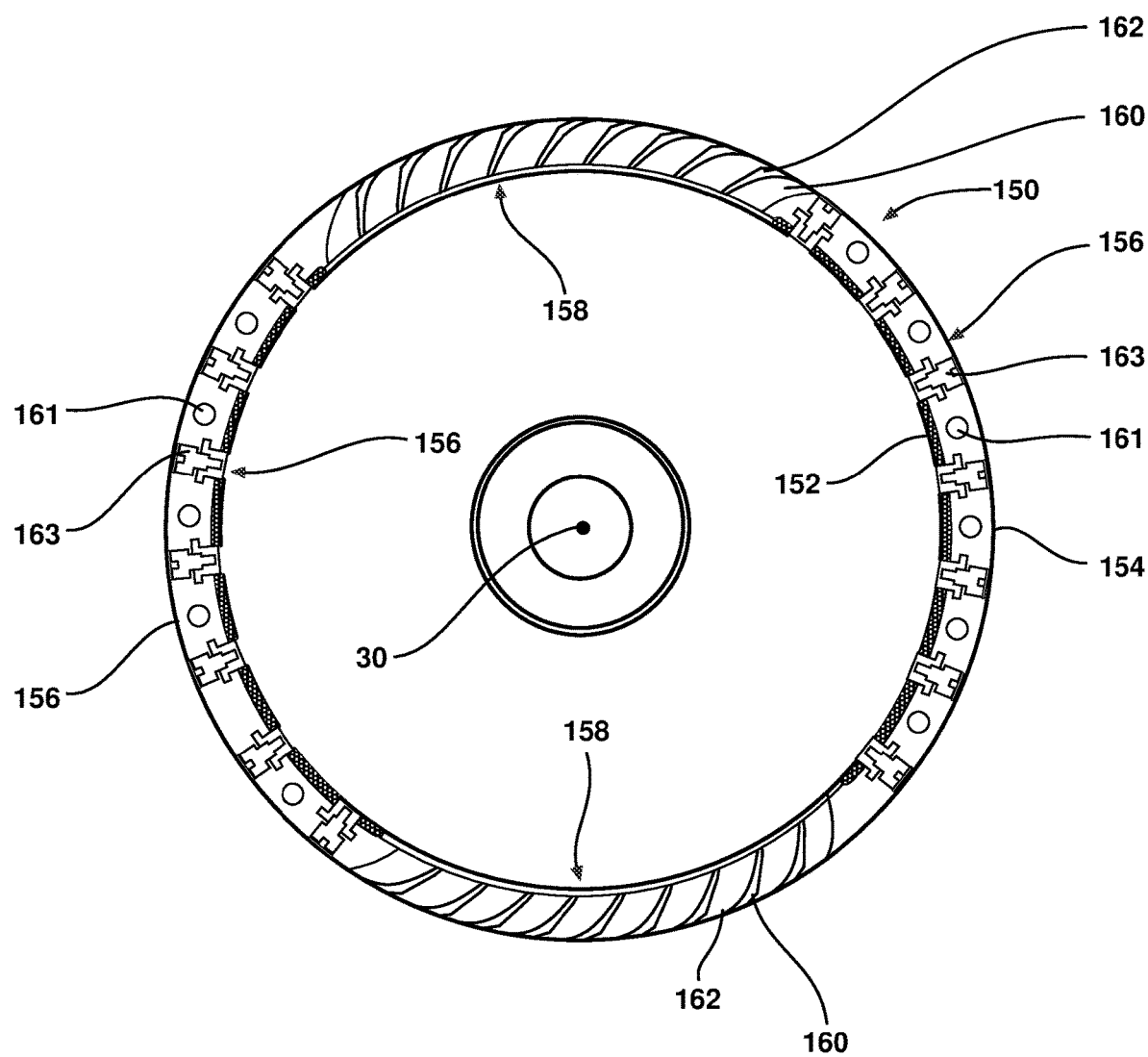
FIG. 3 is a cross sectional view of a rotor case for the wave disk engine of FIG. 1.

Referring now to FIG. 3, a section view of the rotor case 150 is depicted. The rotor case 150 includes an inner wall 152 positioned adjacent the rotor 40 (not shown) and an outer wall 154 positioned adjacent the turbine 200 (not shown). The seal assembly region 156 include a plurality of apertures 161 and pockets 163 formed therein to facilitate assembly and operation of a rotor seal assembly as described below. The rotor exit flow region 158 is defined by a nozzle 160 having a plurality of nozzle vanes 162 operable for accelerating and directing the combustion discharge working fluid flow in a desired direction as the working fluid enters the turbine 200.

Figure 4:
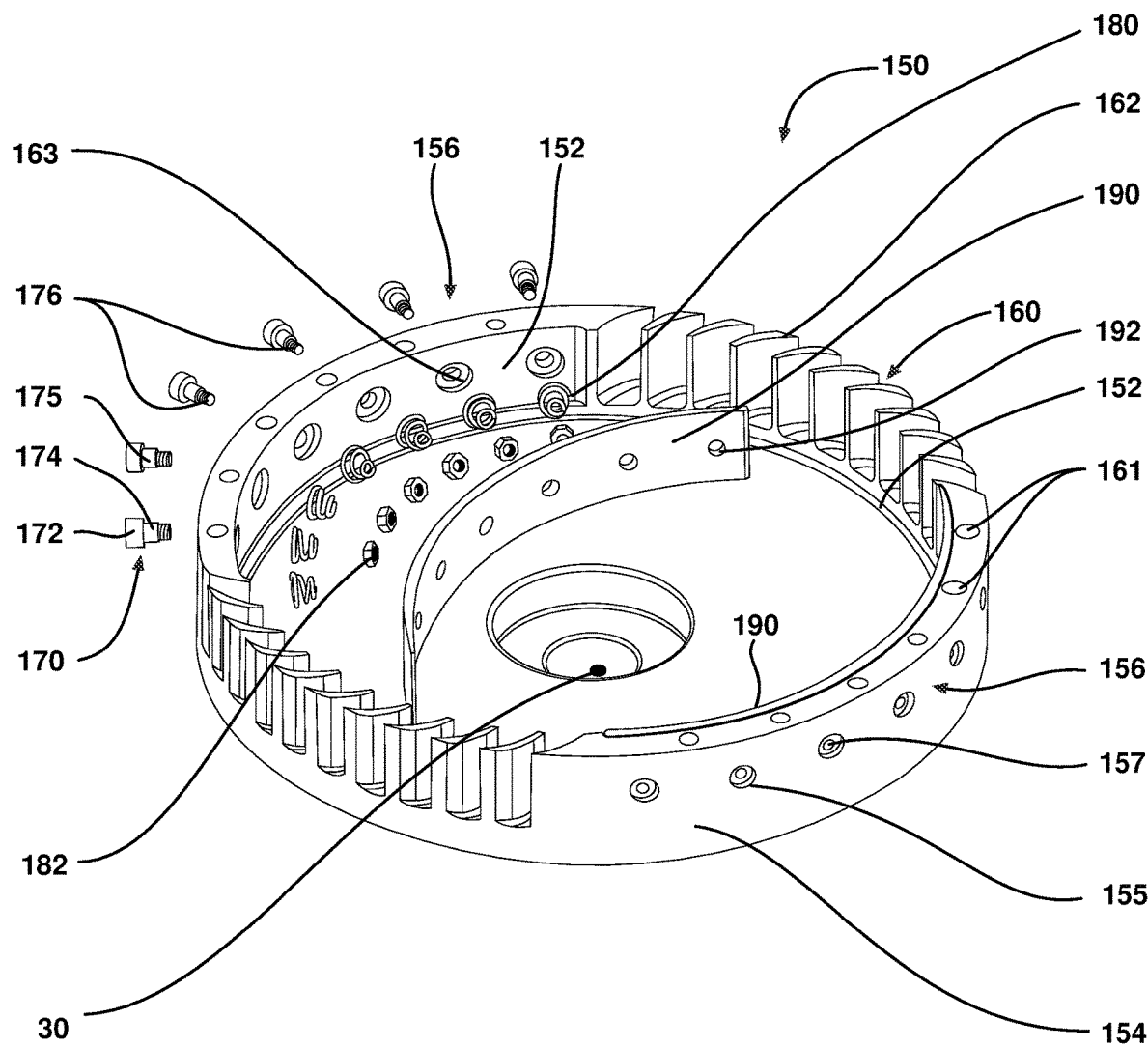
FIG. 4 is an exploded perspective view of a portion of a rotor case and seal for the wave disk engine of FIG. 1.

Referring now to FIG. 4, a partially exploded perspective view of the rotor case 150 is illustrated. A plurality of head apertures 155 are formed in the outer wall 154 of the seal region 156. A smaller diameter through hole 157 extends from the head aperture 155 to a larger pocket 163 formed in the inner wall 152 of the seal region 156. A sliding threaded seal fastener 170 is configured to connect to a seal member 190 and slide axially within the through hole 157 to permit the seal member 190 to move and remain engaged with the tip 60 of the rotor 40 during operation. The threaded seal fastener 170 includes an enlarged head 172 with a shank 174 extending therefrom. The head 172 may contain torqueing features such as slots for screw drivers or hex flats for wrench drivers as one skilled in the art would understand. The shank 174 includes a relatively smooth rod portion 175 with a threaded portion 176 formed at a distal end thereof.

The threaded fastener 170 is inserted through each of the head apertures 155 in the outer wall 154 such that the shank 174 of each of the fasteners 170 extends through the corresponding through hole 157 and radially inward through the corresponding pocket 163. A biasing member 180 is inserted over the shank 174 of the threaded fastener and positioned within a corresponding pocket 163. The smooth rod portion 175 slides relative to the rotor case as the biasing member 180 moves the seal member 190 to contact the rotor tip 160. A threaded nut 182 is then threaded onto the threads 176 of each of the fasteners 170 to capture the biasing member 180. The threads 176 are constructed such that a portion protrude out of the nut 182 so that the protruding portion can threadingly engage with the seal member 190.

The seal member 190 is similarly shaped to that of the inner wall 152 such that the seal member 190 can be positioned directly adjacent to the inner wall 152 of the rotor case 150. The seal member 190 includes a plurality of threaded apertures 192 corresponding to the number of threaded fastener through holes 157 formed in the rotor case 150 at each seal region 156. After assembly of the biasing member 180 and the nut 182, the threaded fasteners 170 can then be threaded into the threaded apertures 192 of the seal member 190. In this manner the biasing members 180 are trapped between the inner wall 152 of the rotor case 150 and the seal member 190. The biasing members 180 exert a radially inward force on the seal member 190 so as to urge the seal member 190 into contact with the tip 60 of the rotor 40. In some forms the biasing member 180 can be a coil spring as depicted, however other devices with potential spring energy suitable in high temperature environments are contemplated as would be understood by those skilled in the art. The contact between the seal 190 and the rotor 40 restricts high pressure working fluid from leaking and recirculating around the rotor vanes 70 prior to exiting though the nozzles 160 of the rotor exit region 158. The seal 190 increases the efficiency of the wave disk engine 10 by minimizing or preventing pressure loss of the working fluid in the turbomachinery.

Figure 5:
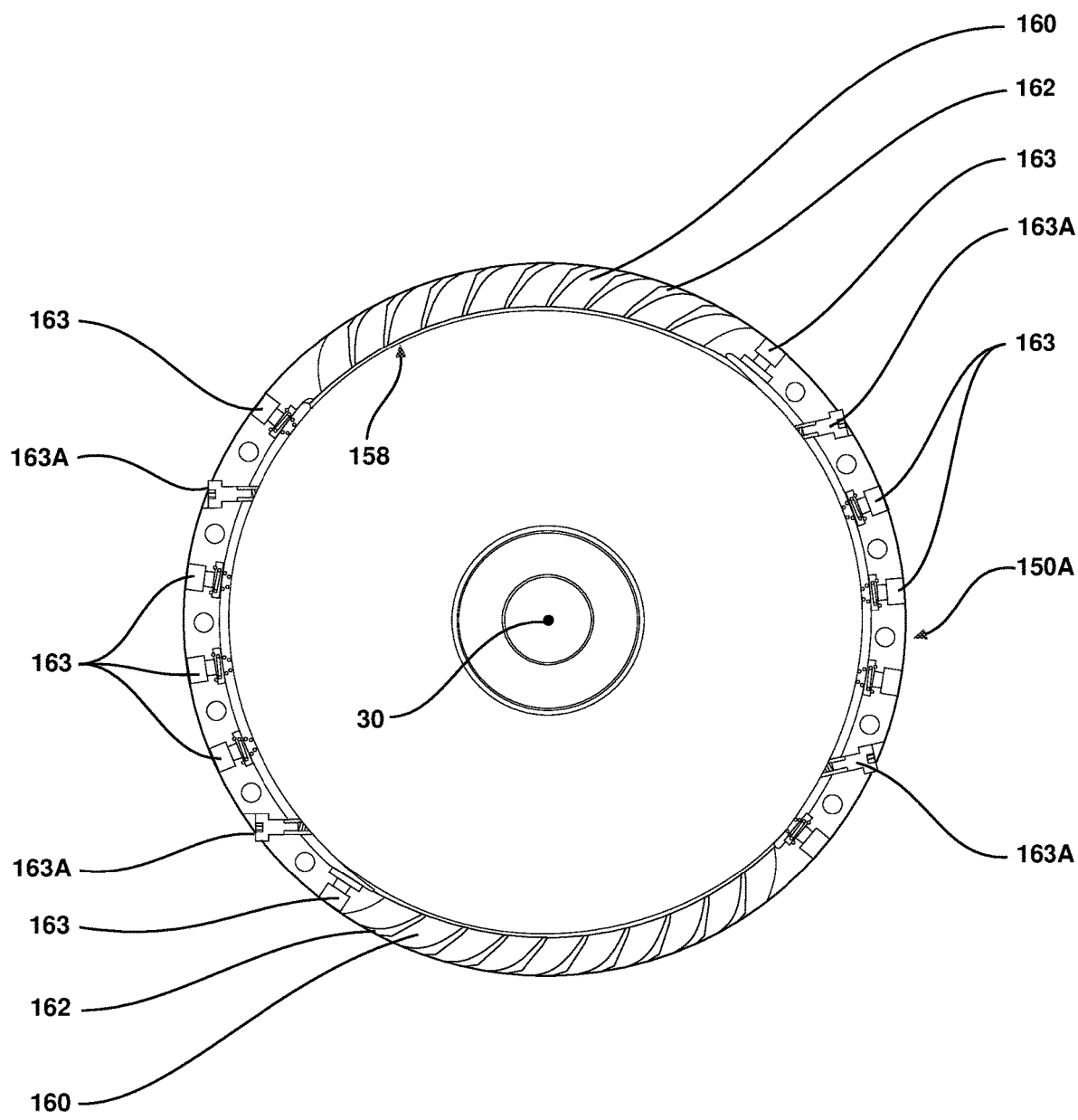
FIG. 5 is a cross sectional view of an alternate rotor case for the wave disk engine of FIG. 1.

FIG. 5 is cross sectional view of a rotor case 150A according to another embodiment of the present disclosure. The rotor case 150A is substantially similar to that of rotor case 150 with the exception of the means for attaching the seal member (not shown). One or more fastener pockets 163A are formed at an angle whereas the fastener pockets 163 are formed along a radial line extending from the center axis 30. The angled geometry facilitates movement of a relatively nonflexible seal member 190. A rigid seal member 190 may become bound up or friction locked if the central axis of each fastener pocket 163 is radially aligned with the axis of rotation 30 of the engine 10 because it is unable to flex in multiple directions. With two bolts on the same axis, the insert is only able to slide back and forth on one axis while retaining its original shape. The material type and design thickness will define the stiffness of the seal member 190, therefore the design requirements will determine the relative stiffness or flexibility of the seal member 190.

While the exemplary embodiment depicts two rotor exit regions 158 and thus two corresponding seal members 190, the invention is not limited as such. For example some wave engines 10 may have only one rotor exit region while other may have three or more exit regions formed within the rotor case 150. The seal members 190 may be formed with any type of material that provides desirable sealing properties, wear properties and cycle life. The materials must be able to withstand the high temperature and pressures of the working fluid within the engine 10. In various forms material selection for the seal member 190 can include metals, metal alloys, high temperature composites, ceramics, and/or Teflon. In general harder/stronger material, such as cast iron or ceramic, could withstand more rigorous combustion conditions and would have a longer wear life than a flexible material like Teflon. Further, a material wear coating can be used in some embodiments, for example an abradable coating.

In some aspects the present disclosure includes a wave rotor disk engine comprising: a radial rotor extending from a rotor hub to a rotor tip; a turbine positioned around the rotor; a rotor case positioned between the rotor and the turbine, the rotor case having at least one seal region and at least one nozzle region; and a movable seal coupled to the rotor case configured to restrict flow of working fluid between the rotor tip and the rotor case.

In refining aspects, the movable seal includes an arcuate seal member having an inner face structured to engage the rotor tip during operation; wherein the seal member includes a plurality of treaded apertures; further comprising a threaded sliding fastener constructed to connect the seal member to the rotor case; wherein the threaded sliding fastener includes a shank having a relatively smooth portion with head formed at one end and a threaded portion formed at the opposing end; further comprising a bias member structured to urge the seal member toward the rotor; further comprising a treaded nut configured to capture the bias member between the rotor case and the seal member; wherein each of the fasteners are threadingly engaged with a corresponding threaded aperture of the seal member; wherein the rotor case includes a plurality of through holes with a head aperture formed in an outer wall and a pocket formed in an inner wall thereof; wherein the head of the threaded fastener is positioned within the head aperture and the bias member is positioned with in the pocket of the rotor case; and wherein the sliding fasteners are slidingly engaged within the apertures to permit the seal member to move relative to the rotor case during operation.

In another aspect, the present disclosure includes seal system for an engine rotor comprising: a rotor case having at least one seal region and at least one nozzle exit region; a rotor rotatable within the rotor case; and a movable seal positioned between the rotor case and the rotor.

In refining aspects, the seal system comprises a sliding fastener connecting the seal member to the rotor case; a bias member positioned between the rotor case and the rotor; a threaded nut coupled to the threaded fastener configured to hold the bias member relative to the fastener; wherein the sliding fastener includes a threaded end portion threadingly engageable with the seal member; and wherein the seal member is movable relative to the rotor case such that a seal surface engages a tip of the rotor during operation.

In another aspect, the present disclosure includes a method comprising: injecting an air/fuel mixture into a hub region of a rotating rotor in a wave rotor disk engine; compressing and combusting the air/fuel mixture within a plurality of combustion channels formed between adjacent radial vanes of the rotor; sealing combustion exhaust working fluid flow between a rotor tip of a rotating rotor with a movable seal member proximate a seal region of a rotor case; and flowing pressurized combustion working fluid through a rotor exit region of the rotor case.

In refining aspects, the sealing includes engaging a seal member with a tip portion of the rotating wave rotor; and wherein the engaging includes urging the seal member toward the tip portion of the rotor with one or more biasing members.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A seal system for an engine rotor comprising:
   a rotor case having at least one seal region and at least one nozzle exit region having a plurality of nozzle vanes extending through the rotor case;
   a rotor having a plurality of rotor blades rotatable within the rotor case;
   a plurality of combustion channels formed within the rotor between adjacent rotor blades;
   a movable seal positioned between the rotor case and the rotor operable to prevent combustion gases from passing through the rotor case at the at least one seal region; and
   wherein the movable seal is passively biased toward the rotor such that a seal surface engages a tip of the rotor continuously during operation.

2. The seal system of claim 1 further comprising a sliding fastener connecting the movable seal to the rotor case.

3. The seal system of claim 2 further comprising a bias member positioned between the rotor case and the rotor.

4. The seal system of claim 3 further comprising a threaded nut coupled to the sliding fastener configured to hold the bias member relative to the fastener.

5. The seal system of claim 2 wherein the sliding fastener includes a threaded end portion threadingly engageable with the seal member.

* * * * *